(12) United States Patent
Akasaka et al.

(10) Patent No.: US 11,121,797 B1
(45) Date of Patent: Sep. 14, 2021

(54) OPTICAL SYSTEM FOR COMPENSATING FOR SIGNAL LOSS

(71) Applicant: Fujitsu Limited, Kawasaki (JP)

(72) Inventors: Youichi Akasaka, Plano, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/984,638

(22) Filed: Aug. 4, 2020

(51) Int. Cl.
*H04J 14/02* (2006.01)
*H04B 10/291* (2013.01)

(52) U.S. Cl.
CPC ...... *H04J 14/0221* (2013.01); *H04B 10/2916* (2013.01); *H04J 14/0261* (2013.01)

(58) Field of Classification Search
None
See application file for complete search history.

(56) References Cited

U.S. PATENT DOCUMENTS

| 6,101,024 A * | 8/2000 | Islam | H01S 3/06754 359/327 |
|---|---|---|---|
| 6,798,567 B2 * | 9/2004 | Feldman | H04B 10/296 359/341.42 |
| 2001/0010585 A1 * | 8/2001 | Nishimura | H04B 10/2916 398/79 |
| 2001/0019448 A1 * | 9/2001 | Yokoyama | H04B 10/2916 359/334 |
| 2002/0021864 A1 * | 2/2002 | Emori | H04B 10/2916 385/27 |
| 2002/0024721 A1 * | 2/2002 | Tsuzaki | H04B 10/2916 359/334 |
| 2002/0097480 A1 * | 7/2002 | Dominic | H04B 10/2916 359/333 |
| 2002/0109906 A1 * | 8/2002 | Grubb | H04B 10/2935 359/334 |
| 2003/0076577 A1 * | 4/2003 | Dominic | H04B 10/2916 359/334 |

* cited by examiner

*Primary Examiner* — Darren E Wolf
(74) *Attorney, Agent, or Firm* — Baker Botts L.L.P.

(57) ABSTRACT

An optical system including a transmission fiber to transmit a WDM input optical signal between first and second points; a second order forward Raman pump module positioned along a first region of the transmission fiber proximate to the first point; a first order backward Raman pump module positioned along a second region of the transmission fiber proximate to the second point, the first order backward Raman pump module is configured to generate a first pumping light along the transmission fiber to amplify the WDM input optical signal at the second region of the transmission fiber, wherein the second order forward Raman pump module is configured to generate a second pumping light along the transmission fiber to amplify the first pumping light generated by the first order backward Raman pump module, wherein the amplified first pumping light amplifies the WDM input optical signal at the first region of the transmission fiber.

14 Claims, 3 Drawing Sheets

OPTICAL SYSTEM FOR COMPENSATING FOR SIGNAL LOSS

BACKGROUND

Field of the Disclosure

The present disclosure relates generally to optical communication networks and, more particularly, to an optical system for compensating for signal loss.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

Erbium-doped fiber amplifiers (EDFAs) have widespread use in optical systems. However, EDFAs can have inherent noisy characteristics that can prevent high level modulation formats such as 256 QAM from longer optical transmission (e.g., greater than 80 kilometers).

SUMMARY

Innovative aspects of the subject matter described in this specification may be embodied in an optical system for compensating for signal loss, comprising a transmission fiber to transmit a wavelength division multiplexing (WDM) input optical signal between a first point and a second point; a second order forward Raman pump module positioned along a first region of the transmission fiber proximate to the first point; and a first order backward Raman pump module positioned along a second region of the transmission fiber proximate to the second point, wherein the first order backward Raman pump module is configured to generate a first pumping light along the transmission fiber to amplify the WDM input optical signal at the second region of the transmission fiber, wherein the second order forward Raman pump module is configured to generate a second pumping light along the transmission fiber to amplify the first pumping light generated by the first order backward Raman pump module, wherein the amplified first pumping light amplifies the WDM input optical signal at the first region of the transmission fiber.

Other embodiments of these aspects include corresponding methods, apparatus, and computer programs, configured to perform the actions of the methods, encoded on computer storage devices.

These and other embodiments may each optionally include one or more of the following features. For instance, the WDM input optical signal is independent of being amplified by the second order forward Raman pump module. The WDM input optical signal is only amplified by the first order backward Raman pump module. The second order forward Raman pump module is configured to generate the second pumping light along the transmission fiber to amplify the first pumping light generated by the first order backward Raman pump module at the first region of the transmission fiber. Further including a power adjustment computing module to adjust a power ratio between the first order backward Raman pump module and the second order forward Raman pump module. The power adjustment computing module adjusts the power ratio to have a power of the WDM signal at the first point and the second point substantially the same. The WDM signal is approximately 1550 nanometers (nm), the first pumping light is approximately 1365 nm, and the second pumping light is approximately 1455 nm. The amplification of the WDM input optical signal at the first and the second regions of the transmission fiber are both less than 15 decibels (dB).

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
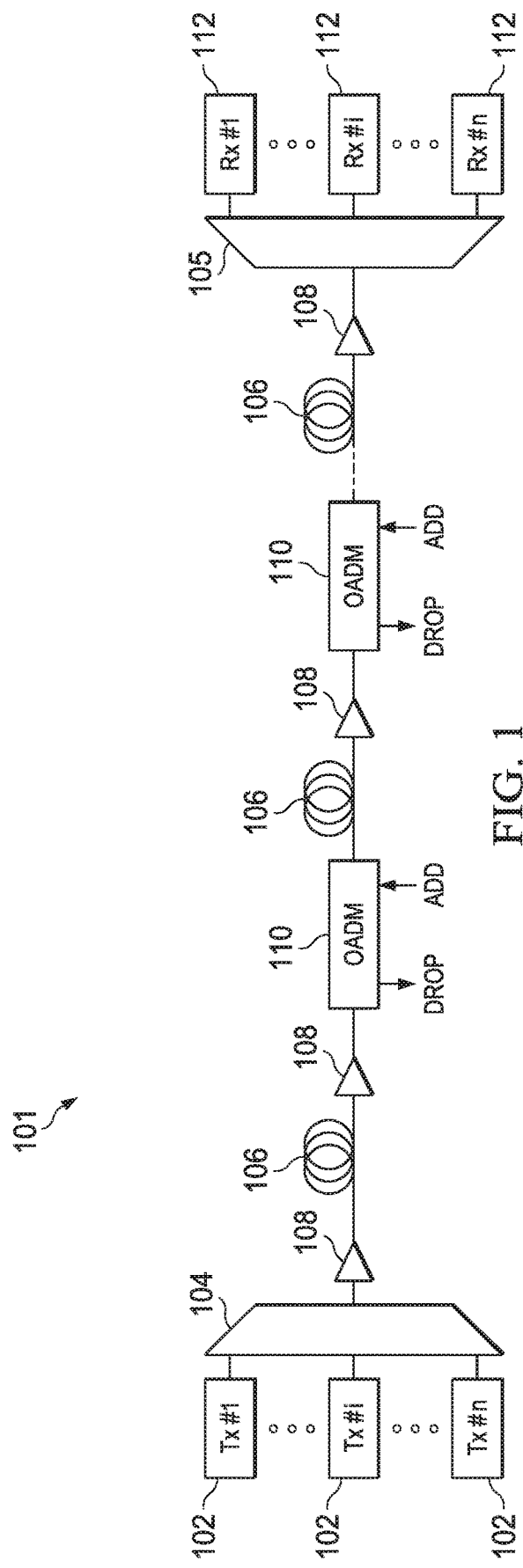
FIG. 1 is a block diagram of selected elements of an embodiment of an optical network.

The present disclosure discusses an optical system and method for compensating for signal loss (power) of an optical signal transmitted along a transmission line. Specifically, the optical signal (a wavelength division multiplexing signal) can be transmitted along the transmission line between a transmitter and a receiver. The optical signal can be amplified at a second region of the transmission line near the receiver of the optical signal (e.g., at an "end" of the transmission line) by a first pumping light. The first pumping light can be generated by a first order backward Raman pump module. The first pumping light can further be amplified at a first region of the transmission line near a transmitter of the optical signal (e.g., at the "beginning" of the transmission line) by a second pumping light. The second pumping light can be generated by a second order forward Raman pump module. The amplified first pumping light can then amplify the optical signal at the first region of the transmission line. Thus, by providing amplification of the optical signal entirely by backward pumping of the optical signal, relative intensity noise (RIN) transfer from the first and the second pumping lights to the optical signal is minimal/suppressed. Additionally, Rayleigh scattering of the optical signal is suppressed by having the gain of the optical signal at the first and the second regions below a threshold (e.g., 15 decibels).

Specifically, the present disclosure discusses an optical system and method for compensating for signal loss, including a transmission fiber to transmit a wavelength division multiplexing (WDM) input optical signal between a first point and a second point; a second order forward Raman pump module positioned along a first region of the transmission fiber proximate to the first point; and a first order backward Raman pump module positioned along a second region of the transmission fiber proximate to the second point, wherein the first order backward Raman pump module is configured to generate a first pumping light along the transmission fiber to amplify the WDM input optical signal at the second region of the transmission fiber, wherein the second order forward Raman pump module is configured to generate a second pumping light along the transmission fiber to amplify the first pumping light generated by the first order backward Raman pump module, wherein the amplified first pumping light amplifies the WDM input optical signal at the first region of the transmission fiber.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the optical signal noise ratio (OSNR) for transmission over optical network 101.

Current designs for optical amplifiers may include optical phase-sensitive amplifiers (PSA). A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals.

Figure 2:
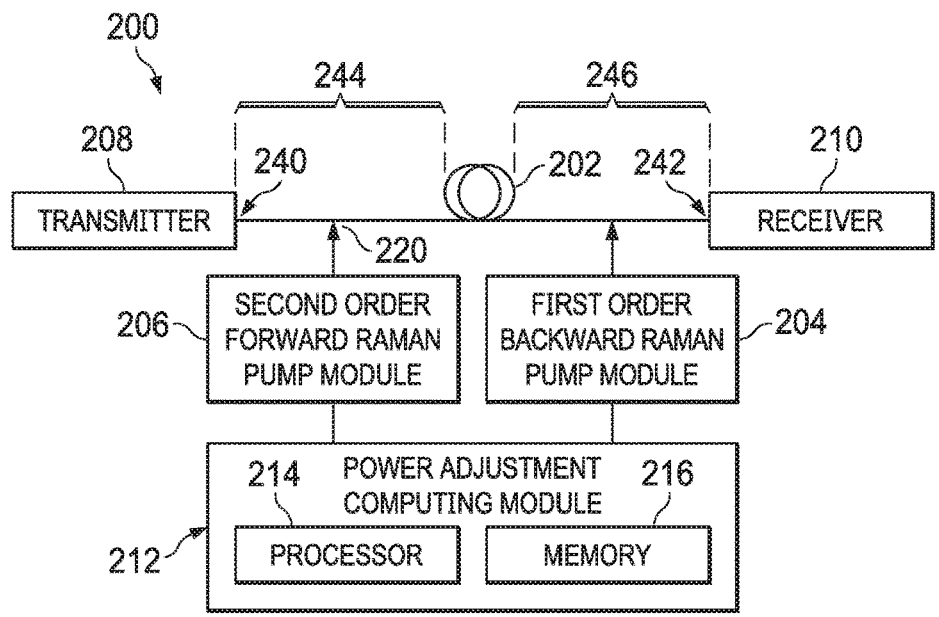
FIG. 2 is a block diagram of selected elements of an embodiment of an optical system for compensating for signal loss in the optical system.

FIG. 2 illustrates an optical system 200 for compensating for signal loss of an optical signal. The optical system 200 can include a transmission fiber 202, a second order forward Raman pump module 206, a first order backward Raman pump module 204, a transmitter 208, a receiver 210, and a power adjustment computing module 212. The power adjustment computing module 212 can be in communication with the second order forward Raman pump module 206 and the first order backward Raman pump module 204. The power adjustment computing module 212 can include a processor 214 and a memory 216. The optical system 200 can include any portion or all of the optical network 101.

The transmitter 208 can transmit a wavelength-division multiplexing (WDM) input optical signal 220 along the transmission fiber 202 between a first point 240 (input) and a second point 242 (output). The transmission fiber 202 can include a first region 244 proximate to the first point 240 and a second region 246 proximate to the second point 242. The second order forward Raman pump module 206 can be positioned along the first region 244 of the transmission fiber 202, and the first order backward Raman pump module 204 can be positioned along the second region 246. In some examples, the first region 244 and the second region 246 are approximately 10-20 kilometers.

The transmission fiber 202 can be associated with a span loss of the optical signal 220 as the optical signal 220 is transmitted along the transmission fiber 202. In some examples, the span loss is approximately 20 decibels (dB). The second order forward Raman pump module 206 and the first order backward Raman pump module 204 can compensate for the span loss of the optical signal 220 as the optical signal 220 is transmitted along the transmission fiber 202, described further herein.

Figure 3:
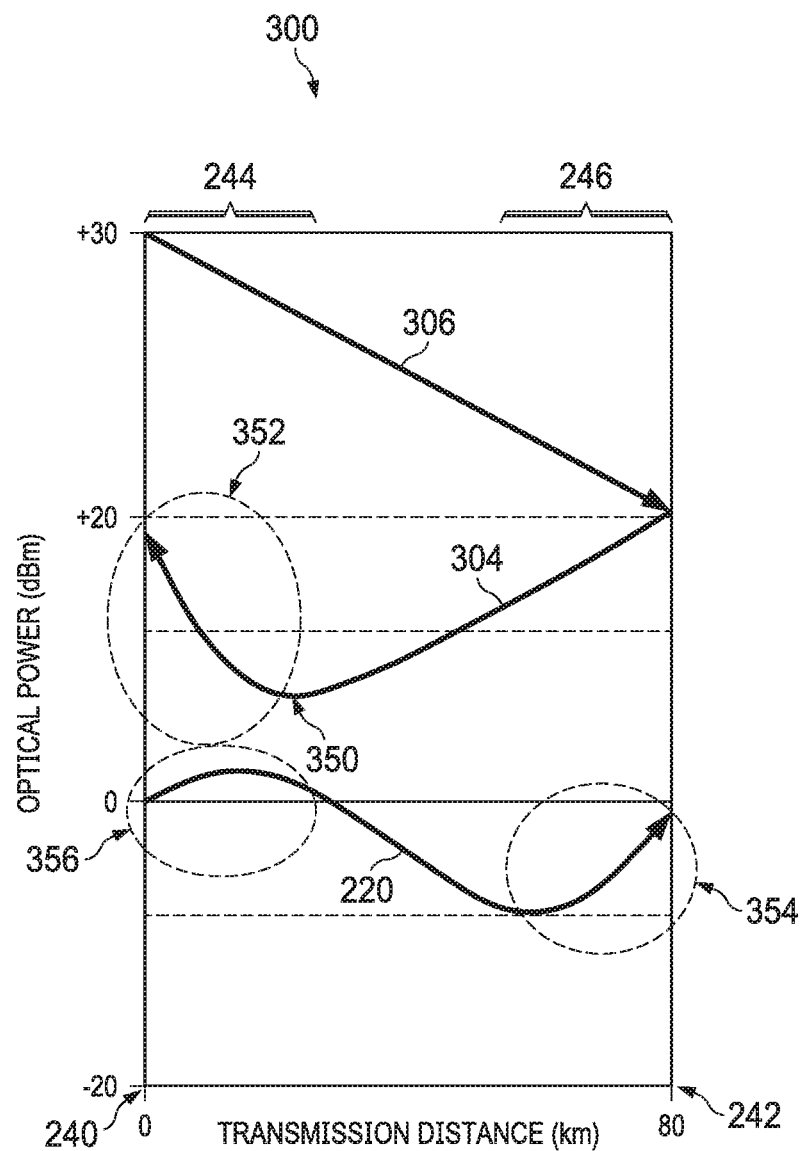
FIG. 3 illustrates a graph of a signal power of an optical signal as the optical signal is transmitted along a transmission fiber of the optical system.

FIG. 3 illustrates an example graph 300 of an optical power of the optical signal 220 as the optical signal 220 is transmitted along the transmission fiber 202 between the transmitter 208 and the receiver 210. The graph 300 further illustrates an optical power of a first pumping light 304 generated by the first order backward Raman pump module 204, and an optical power of a second pumping light 306 generated by the second order forward Raman pump module 206. Specifically, the X-axis illustrates a length of the transmission fiber 202 (e.g., 80 km span for the transmission fiber 202); and the Y-axis illustrates the optical power of the optical signal 220, the optical power of the first pumping light 304, and the optical power of the second pumping light 306 (e.g., from −20 dB to +30 decibel-milliwatts (dBm)). In some examples, the optical signal 220 is associated with a wavelength of approximately 1550 nanometers (nm), the first pumping light 304 is associated with a wavelength of approximately 1455 nm, and the second pumping light 306 is associated with a wavelength of approximately 1365 nm.

The second order forward Raman pump module 206 can generate the second pumping light 306 that travels from the first point 240 to the second point 242. At the first point 240, the second pumping light 306 can have a magnitude of +30 dBm and decrease approximately linearly to the second point 242 to <=+20 dBm.

The first order backward Raman pump module 204 can generate the first pumping light 304 that travels from the second point 242 to the first point 240. The first pumping light 304 can be amplified by the second pumping light 306 that is generated by the second order forward Raman pump module 206. Specifically, the second pumping light 306 generated by the second order forward Raman pump module 206 can amplify the first pumping light 304 generated by the first order backward Raman pump module 204 at the first region 244 of the transmission fiber 202, shown illustratively by area 352 of the first pumping light 304.

To that end, at the second point 242, the first pumping light 304 can have a magnitude of >=+20 dBm and can decrease linearly until approximately point 350. The first pumping light 304 can then be amplified by the second pumping light 306 such that the optical power of the first pumping light 304 increases to the second point 242 to approximately +20 dBm or more.

The first pumping light 304 can amplify the optical signal 220 at the first region 244 and the second region 246 of the transmission fiber 202. Specifically, the first pumping light 304 can amplify the optical signal 220 at the second region 246 of the transmission fiber 202, indicated by area 354 of the optical signal 220. Additionally, the first pumping light 304 that is amplified by the second pumping light 306 (at the area 352) can amplify the optical signal 220 at the first region 244 of the transmission fiber 202, indicated by area 356 of the optical signal 220. In other words, the first pumping light 304 amplifies the optical signal 220 at the second region 246 of the transmission fiber 202; and the amplified first pumping light 304 (amplified by the second pumping light 306) amplifies the optical signal 220 at the first region 244 of the transmission fiber 202. The optical signal 220 is amplified at the first region 244 (e.g., initial 10-20 km) of the transmission fiber 202 by the amplified first pumping light 304 (which is amplified by the second pumping light 306); and is amplified at the second region 246 (e.g., the last 10-20 km) of the transmission fiber 202 by the first pumping light 304.

Thus, the optical signal 220 is independent of being amplified by the second order forward Raman pump module 206. That is, the optical signal 220 is not directly amplified by the second pumping light 306 that is generated by the second order forward Raman pump module 206. The second pumping light 306 only amplifies the first pumping light 304, and does not amplify the optical signal 220. That is, the input optical signal 220 is only amplified by the first pumping light 304 that is generated by the first order backward Raman pump module 204. In some examples, the second order forward Raman pump module 206 does not amplify the optical signal 220 as a result of a difference between the wavelengths of the second pumping light 306 (1365 nm) and the optical signal 220 (1550 nm). The second pumping light 306 does not translate optical power to the optical signal 220. The optical signal 220 can only be amplified by the first pumping light 304 (e.g., 1450 nm).

To that end, the amplification of the optical signal 220 is entirely provided by backward pumping of the optical signal 220—by the first pumping light 304 generated by the first order backward Raman pump module 204 at the second region 246 of the transmission fiber 202, and the amplified first pumping light 304 (that is amplified by the second pumping light 306) at the first region 244 of the transmission fiber 202. As a result, relative intensity noise (RIN) of the optical signal 220 is minimized (negligible). Specifically, backward pumping of the optical signal 220 minimizes transfer of RIN to the optical signal 220 as the direction of travel of the first pumping light 304 (from point 242 to point 240) and the optical signal 220 (from point 240 to point 242) are opposite. Additionally, as the direction of travel of the first pumping light 304 (from point 242 to point 240) and the second pumping light (from point 240 to point 242) are opposite, RIN transfer from the second pumping light 306 to the first pumping light 304 is also minimized (minimal interaction time between pumping lights 304, 306).

In some examples, the amplification of the optical signal 220 at the first region 244 and the second region 246 of the transmission fiber 202 are both less than approximately 15 decibels (dB). By providing the amplification of the optical signal 220 at the first region 244 and the second region 246 of the transmission fiber 202 both less than approximately 15 decibels (dB), double Rayleigh scattering of the optical signal 220 is minimized/suppressed.

In some examples, the power adjustment computing module 212 can adjust an optical power ratio between the first order backward Raman pump module 204 and the second order forward Raman pump module 206. That is, the power adjustment computing module 212 adjusts the amplification power of each of the first pumping light 304 and the second pumping light 306. The power adjustment computing module 212, by adjusting the power of the first pumping light 304 and the second pumping light 306, can control the optical power of the optical signal 220 at the first point 240 and the second point 242 of the transmission fiber 202. Specifically, the power adjustment computing module 212 can adjust the power of the first pumping light 304 and the second pumping light 306 such that the optical power of the optical signal 220 at the first point 240 and the second point 242 of the transmission fiber 202 is substantially the same. In other words, the power adjustment computing module 212 can adjust the power ratio between the first pumping light 304 and the second pumping light 306 such that the optical power of the optical signal 220 at the first point 240 and the second point 242 of the transmission fiber 202 is substantially the same.

Figure 4:
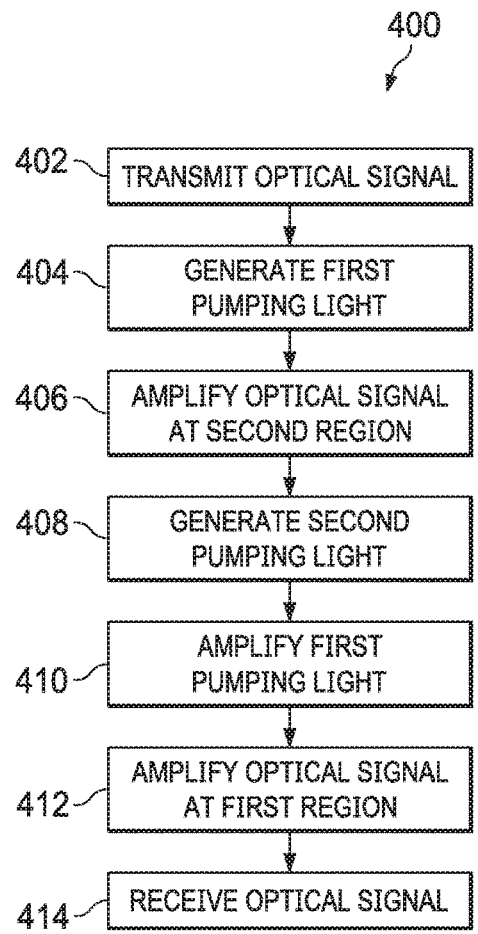
FIG. 4 is a flowchart for compensating for signal loss in the optical system.

FIG. 4 illustrates a flowchart depicting selected elements of an embodiment of a method 400 for compensating for signal loss. The method 400 may be performed by the optical network 101 and/or the optical system 200. It is noted that certain operations described in method 400 may be optional or may be rearranged in different embodiments.

The transmitter 208 transmits the WDM input optical signal 220 between the first point 240 and the second point 242 of the transmission fiber 202, at 402. The first order backward Raman pump module 204 generates the first pumping light 304 along the transmission fiber 202, at 404. The first pumping light amplifies the optical signal 220 at the second region 246 of the transmission fiber 202, at 406. The second order forward Raman pump module 206 generates the second pumping light 306 along the transmission fiber 202, at 408. The second pumping light 306 amplifies the first pumping light 304 along the transmission fiber 202, at 410. The amplified first pumping light 304 amplifies the optical signal 220 at the first region 244 of the transmission fiber 202, at 412. The receiver 210 receives the optical signal 220, at 414.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An optical system for compensating for signal loss, comprising:
   a transmission fiber to transmit a wavelength division multiplexing (WDM) input optical signal between a first point and a second point, the WDM input optical signal is 1550 nanometers (nm);
   a second order forward Raman pump module positioned along a first region of the transmission fiber proximate to the first point; and
   a first order backward Raman pump module positioned along a second region of the transmission fiber proximate to the second point,
   wherein the first order backward Raman pump module is configured to generate a first pumping light along the transmission fiber to amplify the WDM input optical signal at the second region of the transmission fiber, the first pumping light is 1455 nm,
   wherein the second order forward Raman pump module is configured to generate a second pumping light along the transmission fiber to amplify the first pumping light generated by the first order backward Raman pump module, the second pumping light is 1365 nm,
   wherein the amplified first pumping light amplifies the WDM input optical signal at the first region of the transmission fiber,
   wherein a direction of travel of the first pumping light is opposite to a direction of travel of the WDM input optical signal,
   wherein the direction of travel of the first pumping light is opposite to the direction of travel of the second pumping light.

2. The optical system of claim 1, wherein the WDM input optical signal is independent of being amplified by the second order forward Raman pump module.

3. The optical system of claim 1, wherein the WDM input optical signal is only amplified by the first order backward Raman pump module.

4. The optical system of claim 1, wherein the second order forward Raman pump module is configured to generate the second pumping light along the transmission fiber to amplify the first pumping light generated by the first order backward Raman pump module at the first region of the transmission fiber.

5. The optical system of claim 1, further comprising a power adjustment computing module to adjust a power ratio between the first order backward Raman pump module and the second order forward Raman pump module.

6. The optical system of claim 5, wherein the power adjustment computing module adjusts the power ratio to have a power of the WDM input optical signal at the first point and the second point the same.

7. The optical system of claim 1, wherein the amplification of the WDM input optical signal at the first and the second regions of the transmission fiber are both less than 15 decibels (dB).

8. A method for compensating for signal loss in an optical network, comprising:
- transmitting a wavelength division multiplexing (WDM) input optical signal between a first point and a second point of a transmission fiber, the WDM input optical signal is 1550 nanometers (nm);
- generate, by a first order backward Raman pump module positioned along a second region of the transmission fiber proximate to the second point, a first pumping light along the transmission fiber, the first pumping light is 1455 nm;
- amplify, by the first pumping light, the WDM input optical signal at the second region of the transmission fiber;
- generate, by a second order forward Raman pump module positioned along a first region of the transmission fiber proximate to the first point, a second pumping light along the transmission fiber, the second pumping light is 1365 nm;
- amplify, by the second pumping light, the first pumping light along the transmission fiber; and
- amplify, by the amplified first pumping light, the WDM input optical signal at the first region of the transmission fiber,
- wherein a direction of travel of the first pumping light is opposite to a direction of travel of the WDM input optical signal,
- wherein the direction of travel of the first pumping light is opposite to the direction of travel of the second pumping light.

9. The method of claim 8, wherein the WDM input optical signal is independent of being amplified by the second order forward Raman pump module.

10. The method of claim 8, wherein the WDM input optical signal is only amplified by the first order backward Raman pump module.

11. The method of claim 8, wherein the second pumping light amplifies the first pumping light at the first region of the transmission fiber.

12. The method of claim 8, further comprising adjusting a power ratio between the first order backward Raman pump module and the second order forward Raman pump module.

13. The method of claim 12, wherein adjusting the power ratio includes adjusting the power ratio to have a power of the WDM input optical signal at the first point and the second point the same.

14. The method of claim 8, wherein the amplification of the WDM input optical signal at the first and the second regions of the transmission fiber are both less than 15 decibels (dB).

* * * * *